United States Patent
Vogtmeier et al.

(10) Patent No.: US 7,435,966 B2
(45) Date of Patent: Oct. 14, 2008

(54) X-RAY DETECTOR

(75) Inventors: Gereon Vogtmeier, Aachen (DE);
Francisco Morales Serrano, Eindhoven (NL); Roger Steadman, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 93 days.

(21) Appl. No.: 10/543,563

(22) PCT Filed: Jan. 22, 2004

(86) PCT No.: PCT/IB2004/050046

§ 371 (c)(1),
(2), (4) Date: Jul. 27, 2005

(87) PCT Pub. No.: WO2004/068168

PCT Pub. Date: Aug. 12, 2004

(65) Prior Publication Data

US 2006/0138335 A1    Jun. 29, 2006

(30) Foreign Application Priority Data

Jan. 28, 2003    (EP)    ................................. 03100166

(51) Int. Cl.
*G01T 1/24*    (2006.01)
(52) U.S. Cl. ................................................. 250/370.11
(58) Field of Classification Search ............. 250/370.11
See application file for complete search history.

(56) References Cited

U.S. PATENT DOCUMENTS

| | | | | |
|---|---|---|---|---|
| 4,180,737 A | * | 12/1979 | Kingsley | .................... 250/367 |
| 5,617,463 A | * | 4/1997 | Beierlein | ................... 378/98.3 |
| 6,215,844 B1 | * | 4/2001 | Adachi et al. | .................. 378/19 |
| 6,221,687 B1 | | 4/2001 | Abramovich | |
| 6,252,285 B1 | * | 6/2001 | Furumiya et al. | ........... 257/432 |
| 6,307,243 B1 | | 10/2001 | Rhodes | |
| 6,472,665 B1 | * | 10/2002 | Ishisaka et al. | ............. 250/368 |
| 6,474,665 B1 | | 11/2002 | Fink et al. | |
| 6,895,077 B2 | * | 5/2005 | Karellas et al. | ............ 378/98.3 |
| 2003/0042425 A1 | * | 3/2003 | Tashiro et al. | .......... 250/370.11 |

FOREIGN PATENT DOCUMENTS

EP    0 583 844 A1    2/1994
JP    04276587 A    *  10/1992

* cited by examiner

*Primary Examiner*—Christine Sung

(57) ABSTRACT

The invention relates to an X-ray detector for detecting X-radiation, as used, in particular, in computer tomographic (CT) systems. The X-ray detector in accordance with the invention is composed of a photo sensor device, which comprises individual detector elements (1), above which scintillator elements (2) are disposed. These convert the incident X-ray light (6) into visible or UV light (7), which is detected by a photodiode (4) located on the detector element (1). In accordance with the invention, a micro-lens (3), which focuses the light (7) departing from the scintillator element (2) onto the photodiode (4), is disposed between the scintillator element (2) and the detector element (1). It is possible, in this manner, to use large areas of the detector element (1) for further electronic components (5) outside the photodiode (4), and, at the same time, to ensure a high DQE (Detection Quantum Efficiency) in that the light (7) departing from the scintillator element (2) is virtually fully exploited. The crosstalk from scatter radiation from adjacent detector elements is effectively prevented simultaneously.

18 Claims, 2 Drawing Sheets

X-RAY DETECTOR

The invention relates to an X-ray detector for detecting X-radiation, which is equipped with scintillator elements and a photosensor device. X-ray detectors of this kind are required, in particular, for computer tomographic (CT) systems.

In computer tomography, as in other image-producing X-ray methods, the X-radiation exerting its effect on the patient under examination is attenuated in accordance with the density and chemical composition of the tissue and bones. The photons of the X-radiation to be detected are then absorbed in the X-ray detector, initially by a scintillator material, which in turn re-emits photons in the range of visible or ultraviolet light. The light thus arising then falls onto a photosensor device, which generally comprises a multiplicity of individual detector elements, which are also designated channels. Accordingly, an X-ray detector may comprise from some thousands to several million pixels, wherein the size of the individual pixels may lie in the range from 0.03 to 30 $mm^2$, especially in the range from 1 to 2 $mm^2$. Photodiodes on CMOS chips are typically used hereby for light detection.

The resolution capability of an X-ray detector naturally increases along with the number of pixels. The resolution is, however, critically influenced negatively by crosstalk, in which scatter radiation gains access to detector elements adjacent to the provided detector element. In order to reduce this crosstalk, the X-radiation can pass through an anti-scatter grid focused on the focal point of the radiation source. In addition, absorber plates, which absorb oblique-incidence scatter radiation and thereby prevent it from reaching the adjacent detector element, may lie between the individual scintillator crystals.

In addition to the photodiode that converts the incident light into an electrical signal, the presence on the individual detector elements of further electronic components, especially transistors, which serve for processing the signals, is necessary. The problem hereby arises that the incident-light surface of a pixel is exploited only partially if the photodiode forms only one part of the surface of the detector element The DQE (Detection Quantum Efficiency) is reduced accordingly. If, on the other hand, the photodiode surface is increased relative to the overall surface of the detector element, the surface usable for further electronic components for processing the signals is reduced accordingly. Compromises are therefore necessary, and these cannot represent the optimum in either respect.

It is therefore an object of the invention, starting from the prior art, to create an X-ray detector in which the incident-light surface of every pixel is exploited virtually in its entirety, and in which, nevertheless, an adequate, usable area is available for further electronic components on the surface of each detector element. In addition, the problem of crosstalk is to be further reduced.

The object is achieved in accordance with the invention by means of an X-ray detector with a photosensor device and scintillator elements, wherein disposed between the photosensor device and the scintillator elements are micro-lenses, which focus the light departing from the scintillator elements onto particular areas or parts of the photosensor device. The invention further relates to a computer tomograph with an X-ray detector in accordance with the invention.

The focusing, by means of micro-lenses located between the scintillation material and the photosensor device which converts the incident light into electrical signals, of the light arising as a result of the conversion, with the aid of the scintillator elements, of the X-radiation, considerably reduces the above-mentioned crosstalk, since the micro-lenses can laterally deflect incident radiation adjacent to the sensitive areas of a detector element and can accordingly prevent this radiation from entering neighboring detector elements. In addition, light in the boundary area of a pixel can also be used virtually to the full in this manner without the risk arising that this light will enter neighboring detector elements, so the overall quantum efficiency can be considerably improved.

The invention can be applied especially advantageously when the photosensor device comprises individual detector elements, as is typical for X-ray detectors. A matrix of detector elements of this kind may comprise up to several million individual elements. By means of the disposal of a micro-lens between the detector element and the associated scintillator element, the light can be focused accordingly onto a particular area of the detector element. Photodiodes are advantageously used to detect the light, wherein each detector element usefully comprises at least one photodiode. However, detection may perfectly well also take place with the aid of avalanche diodes or photomultipliers.

In particular, the invention enables especially large areas of the surface of the detector elements to be used for further electronic components, such as preprocessing electronics. The photodiode itself accordingly constitutes only one part of the surface. Nevertheless, the part of the incident-light surface that is not located vertically above the photodiode must not be dispensed with, since the light in this area is focused onto the photodiode by the micro-lens. As a result, despite the comparatively large useful area for further electronic components, the DQE is virtually unreduced, meaning that no compromises are necessary in this regard.

The positioning of the photodiode on the detector element depends fundamentally on the design of the micro-lens. However, this micro-lens is usefully symmetrical in design, so the light falling onto the detector element is focused onto the center of the detector element. Accordingly, the photodiode should also be disposed centrally on the detector element.

The micro-lens is expediently selected in respect of its focal length, and positioned in respect of its distance from the detector element, in such a way that the incident light in the area of a detector element is focused precisely onto the surface of the photodiode of the detector element. In this case, virtually 100% of the incident-light surface is used, although the photodiode forms only a part of the surface of the detector element.

Typically, one micro-lens is assigned to each detector element in order to focus the light falling on the detector element exclusively onto the photodiode belonging to the detector element. The incidence of light onto the photodiode of an adjacent detector element is, accordingly, virtually excluded. In addition, the micro-lenses may be of a design such that lateral incident light is deflected onto areas of the detector element outside the photodiode.

As regards the efficiency of the X-ray detector in accordance with the invention, square-lens structures with a square base area of the micro-lens have proved especially advantageous. Through the provision of square pixels combined with square-lens structures, the most complete possible use of the incident-light surface is also enabled in an especially simple manner.

As regards the surface geometry of the micro-lenses, various options are conceivable. In particular, the surface of the side of the micro-lens facing the scintillator element may also be matched to this surface of the scintillator element, and the micro-lens may directly adjoin the scintillator element. The correct positioning of the micro-lens relative to the scintillator element and, if applicable, the antiscatter grid, is also achieved in this manner. It is hereby possible both to design the corresponding micro-lens surface to be planar, and to couple it flat against the scintillator element, and to design the micro-lens surface to be convex if the associated scintillator element has a corresponding concave shape. A concave shape of this kind may be produced, for example, in the crystal compression structure of a scintillator element produced from individual scintillator particles. In particular, matrix of detector elements may take place owing to the arched micro-lens shape if the surfaces of the micro-lenses are matched to the corresponding surfaces of the scintillator elements.

In addition to the positioning of a photodiode preferably in the center of the detector element, it is also possible to accommodate on the detector element additional scatter diodes, which are intended to detect, in particular, scatter radiation. This scatter radiation is caused, in particular, by crosstalk of neighboring pixels and, with a suitable geometry of the micro-lens, is deflected to areas of the detector element outside of the actual photodiode. The provision of these additional scatter diodes makes it possible to make further geometrical statements regarding the vertically incident direct radiation and the laterally incident radiation. In additional, the crosstalk can be monitored in this manner.

It is, of course, possible to provide the X-ray detector in accordance with the invention with additional features as known from the prior art, such as optical filters, a scatter-radiation grid focused on the focal point of the radiation source or X-ray-absorbing shields (separators) incorporated into the scintillator configuration. The use of CMOS chips for accommodating the detector elements has proved especially advantageous.

It goes without saying that, even if the X-ray detector in accordance with the invention is destined to be used primarily in a computer tomograph, its use in other areas, such as nondestructive materials testing, is also possible.

The invention will be further described with reference to examples of embodiments shown in the drawings, to which, however, the invention is not restricted.

Figure 1:
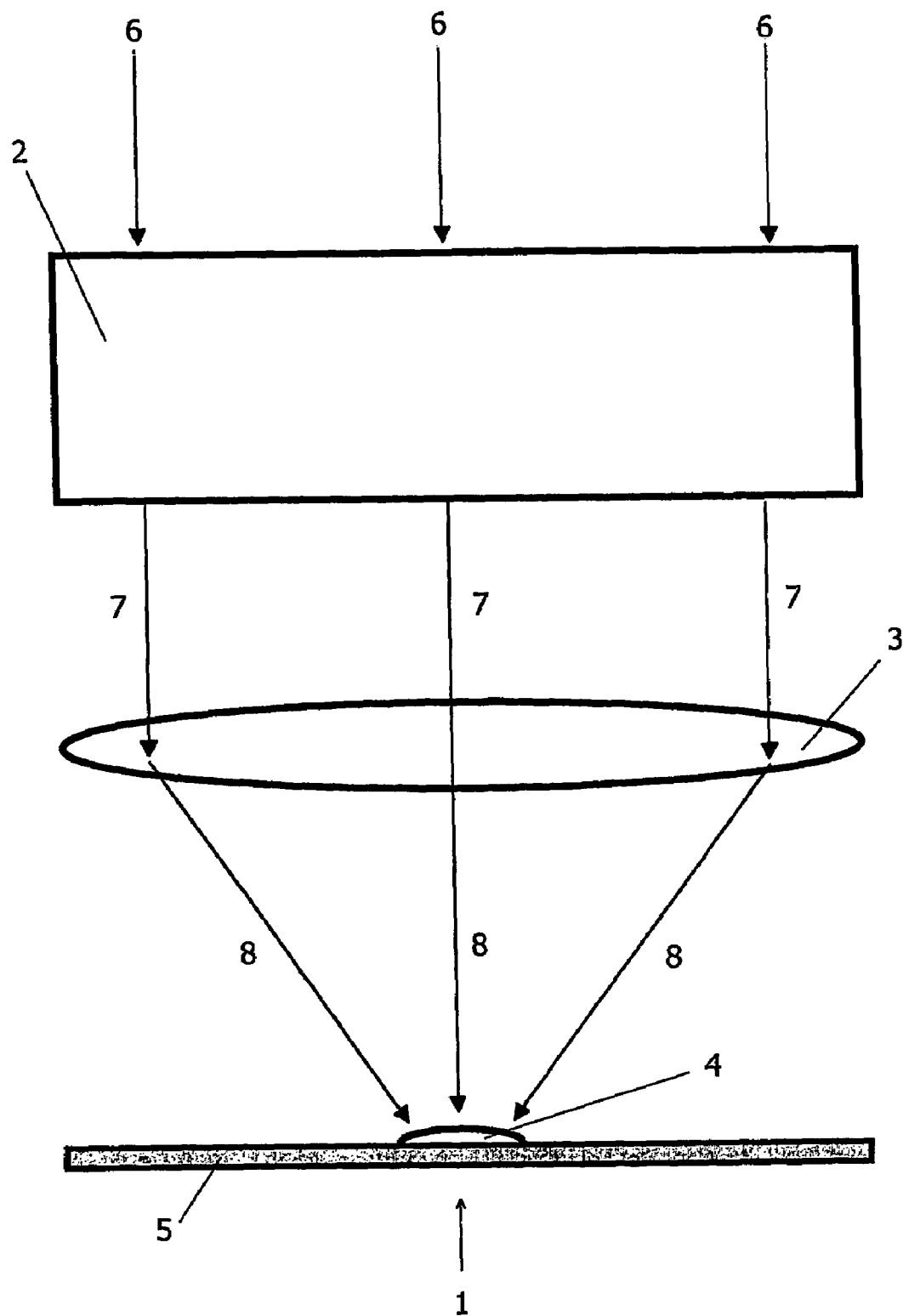
FIG. 1 shows the side view of a segment of an X-ray detector in accordance with the invention.

FIG. 1 shows, schematically, the structure of a pixel which belongs to the X-ray detector in accordance with the invention. This comprises a detector element which, in its entirety, is provided with the reference number 1, and centrally located on the surface of which is a photodiode 4. Above the detector element 1 is located a micro-lens 3, which focuses the light 7 departing from the scintillator element 2. For its part, the scintillator element 2 converts the X-ray light 6 falling onto the scintillator element 2 into visible or ultraviolet light 7. The light 8 focused through the micro-lens 3 falls onto the photodiode 4, which in turn converts the incident light into electrical signals. The photodiode 4 hereby covers only a small part of the detector element 1, whereas various electronic components 5 serving for the further processing of the electrical signals are located outside the photodiode 4. Nevertheless, owing to the focusing of the light 7 by the micro-lens 3, virtually the entire incident-light surface originating from the scintillator element 2 is exploited, since the light 7 falling vertically onto the micro-lens 3 is focused virtually in its entirety onto the photodiode 4. At the same time, the micro-lens 3 is able to deflect laterally-incident light onto areas of the detector element 1 outside the photodiode 4. The invention thereby combines a large useful area for further electronic components 5 with an extensive exploitation of the incident light and an associated high quantum efficiency (DQE).

Figure 2:
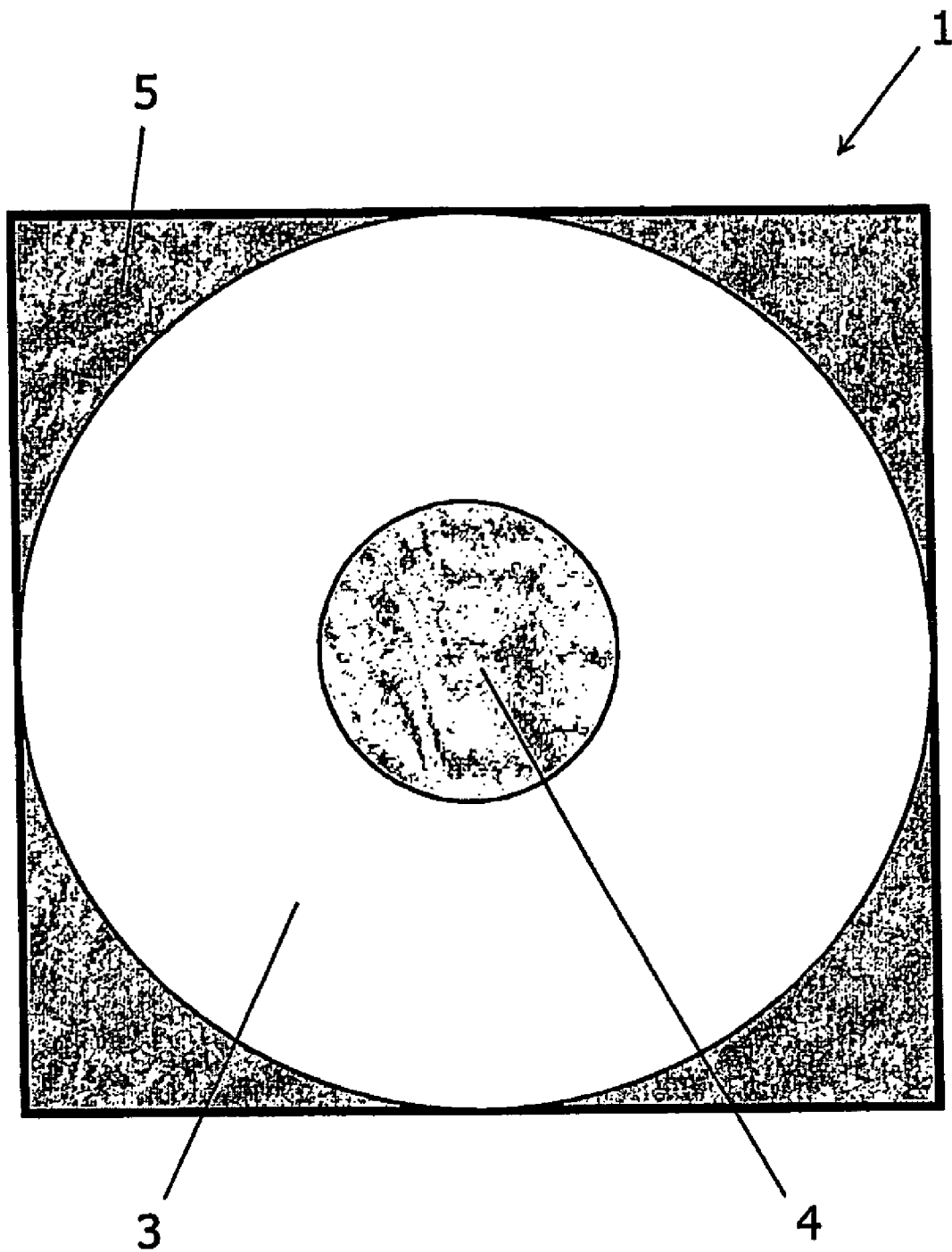
FIG. 2 shows the view from above onto a detector element of an X-ray detector in accordance with the invention.

FIG. 2 shows, in plan view, a detector element 1 as part of the X-ray detector in accordance with the invention. The detector element 1 is here square in design, wherein the photodiode 4 is located in the center of the detector element 1. Outside the photodiode 4 electronic components 5 are again located on the detector element 1. The micro-lens 3 focuses the incident light onto the photodiode 4.

The invention claimed is:

1. An X-ray detector, comprising:
   a photosensor device, including:
      at least one detector element, including:
         a photosensor disposed centrally on the detector element;
         additional scatter diodes; and
         electronic components located in the detector element outside an area of the photosensor;
   scintillator elements; and
   micro-lenses are disposed between the photosensor device and the scintillator elements, wherein said micro-lenses focus light emitted from the scintillator elements onto parts of the photosensor device.

2. The X-ray detector as claimed in claim 1, wherein the photosensor device comprises a matrix of individual detector elements.

3. The X-ray detector as claimed in claim 1, wherein the photosensor includes at least one photodiode.

4. The X-ray detector as claimed in claim 1, wherein the photosensor forms only one pail of the surface of the detector element.

5. The X-ray detector as claimed in claim 1, wherein the electronic components surround the photo sensor.

6. The X-ray detector as claimed in claim 3, wherein the micro-lenses have a focal length and a distance from the detector elements such that the incident light in the area of a detector element is focused onto the surface of the photodiode of the detector element.

7. The X-ray detector as claimed in claim 2, wherein one micro-lens is assigned to each detector element.

8. The X-ray detector as claimed in claim 1, wherein the micro-lenses have a square base area.

9. The X-ray detector as claimed in claim 1, wherein the micro-lenses directly adjoin the scintillator elements, 10. The X-ray detector as claimed in claim 9, wherein the surfaces of the sides of the micro-lenses facing the scintillator elements are matched to the surfaces of the scintillator elements.

11. The X-ray detector as claimed in claim 10, wherein the surfaces of the sides of the micro-lenses facing the scintillator elements are planar and lie flat against the scintillator elements.

12. The X-ray detector as claimed in claim 10, wherein the surfaces of the sides of the micro-lenses facing the scintillator elements are convex and matched to corresponding concave shapes of the scintillator elements.

13. The X-ray detector as claimed in claim 1, wherein the X-ray detector comprises optical filters.

14. The X-ray detector as claimed in claim 2, wherein the detector elements are components of CMOS chips.

15. A computer tomograph with an X-ray detector as claimed in claim 1.

16. An x-ray detector comprising:
   one or more scintillator elements;
   one or more detector elements, each detector element having a surface and comprising one or more photodiodes in a light detection sub-area of the surface and one or more electrical components in a second sub-area of the surface, wherein at least one of the one or more photodiodes is disposed in a central area of a corresponding one of the one or more detector elements and the second sub-area of the corresponding detector element is located outside of the central area wherein at least one of the one or more detector elements includes multiple scatter diodes; and one or more micro-lenses disposed between said one or more scintillator elements and said one or more detector elements, wherein each micro-lens focuses light from a given scintillator onto a corresponding photodiode.

17. The x-ray detector of claim 16, wherein said one or more micro-lens have a square lens.

18. An x-ray detector comprising:
one or more scintillator elements, which converts x-ray radiation into UV light;
one or more detector elements, and
one or more micro-lenses that focus light from a given scintillator onto a corresponding photosensor located in a first sub-portion of a surface of a detector element and deflect lateral incident light onto a second sub-portion of the surface of the detector element; wherein at least one of the one or more detector elements includes multiple scatter diodes.

* * * * *